(12) United States Patent
Jeyabalan

(10) Patent No.: US 10,428,926 B2
(45) Date of Patent: Oct. 1, 2019

(54) HYDROKINETIC TORQUE COUPLING DEVICE WITH TURBINE MADE OF LIGHTWEIGHT MATERIAL AND TORSIONAL VIBRATION DAMPER

(71) Applicant: VALEO EMBRAYAGES, Amiens (FR)

(72) Inventor: Subramanian Jeyabalan, Troy, MI (US)

(73) Assignee: Valeo Embrayages, Amiens (FR)

( * ) Notice: Subject to any disclaimer, the term of this patent is extended or adjusted under 35 U.S.C. 154(b) by 129 days.

(21) Appl. No.: 15/822,743

(22) Filed: Nov. 27, 2017

(65) Prior Publication Data

US 2019/0162284 A1    May 30, 2019

(51) Int. Cl.
| | |
|---|---|
| *F16H 45/02* | (2006.01) |
| *F16D 1/112* | (2006.01) |
| *F16H 57/00* | (2012.01) |

(52) U.S. Cl.
CPC ............ *F16H 45/02* (2013.01); *F16D 1/112* (2013.01); *F16H 2045/0205* (2013.01); *F16H 2045/0221* (2013.01); *F16H 2045/0226* (2013.01); *F16H 2045/0278* (2013.01); *F16H 2057/0012* (2013.01)

(58) Field of Classification Search
CPC ............ F16H 45/02; F16H 2045/0221; F16H 2045/0226; F16H 2045/0278; F16D 1/112
See application file for complete search history.

(56) References Cited

U.S. PATENT DOCUMENTS

| | | | | |
|---|---|---|---|---|
| 6,024,195 A | * | 2/2000 | Hinkel | F16H 45/02 192/3.28 |
| 6,244,401 B1 | * | 6/2001 | Maienschein | F16H 45/02 192/213.1 |
| 6,439,361 B2 | * | 8/2002 | Maienschein | F16H 45/02 192/213.1 |
| 6,471,021 B1 | * | 10/2002 | Sasse | F16H 41/24 192/110 B |
| 6,695,110 B2 | * | 2/2004 | Maienschein | F16H 45/02 192/213.1 |
| 10,113,624 B2 | * | 10/2018 | Yin | F16H 45/02 |

(Continued)

FOREIGN PATENT DOCUMENTS

WO    WO9313338    7/1993

*Primary Examiner* — David R Morris
(74) *Attorney, Agent, or Firm* — Berenato & White, LLC

(57) ABSTRACT

A hydrokinetic torque-coupling device comprises an impeller wheel, a turbine wheel drivable by the impeller wheel, a torsional vibration damper, and a turbine hub non-rotatably connected to the turbine wheel. The turbine wheel includes a turbine shell and at least one coupling pin formed integrally with the turbine shell and extending radially outwardly from the turbine shell. The torsional vibration damper comprises a first damper, a driven member rotatable relative to the first damper retainer, and damper elastic members interposed between the first damper retainer and the driven member. The turbine hub is non-rotatably coupled to the driven member of the torsional vibration damper. The first damper retainer has at least one angularly extending bayonet slot configured to receive the at least one coupling pin therein such that the at least one coupling pin being angularly moveable in the at least one bayonet slot relative to the first damper retainer.

21 Claims, 16 Drawing Sheets

(56) References Cited

U.S. PATENT DOCUMENTS

2001/0008198 A1* 7/2001 Maienschein ........... F16H 45/02
                                                   192/3.29
2002/0125093 A1* 9/2002 Maienschein ........... F16H 45/02
                                                   192/3.3
2018/0135738 A1* 5/2018 Yin ......................... F16H 45/02

* cited by examiner

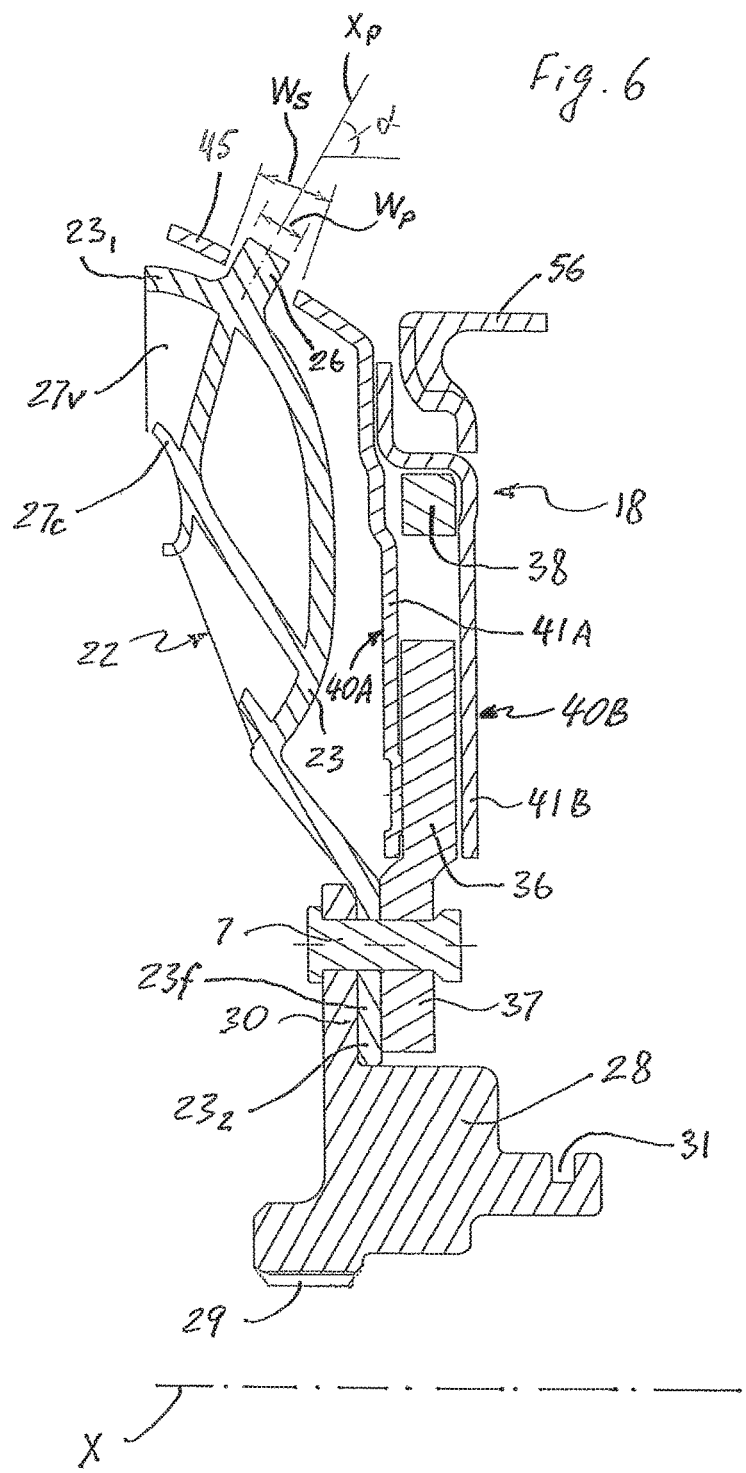

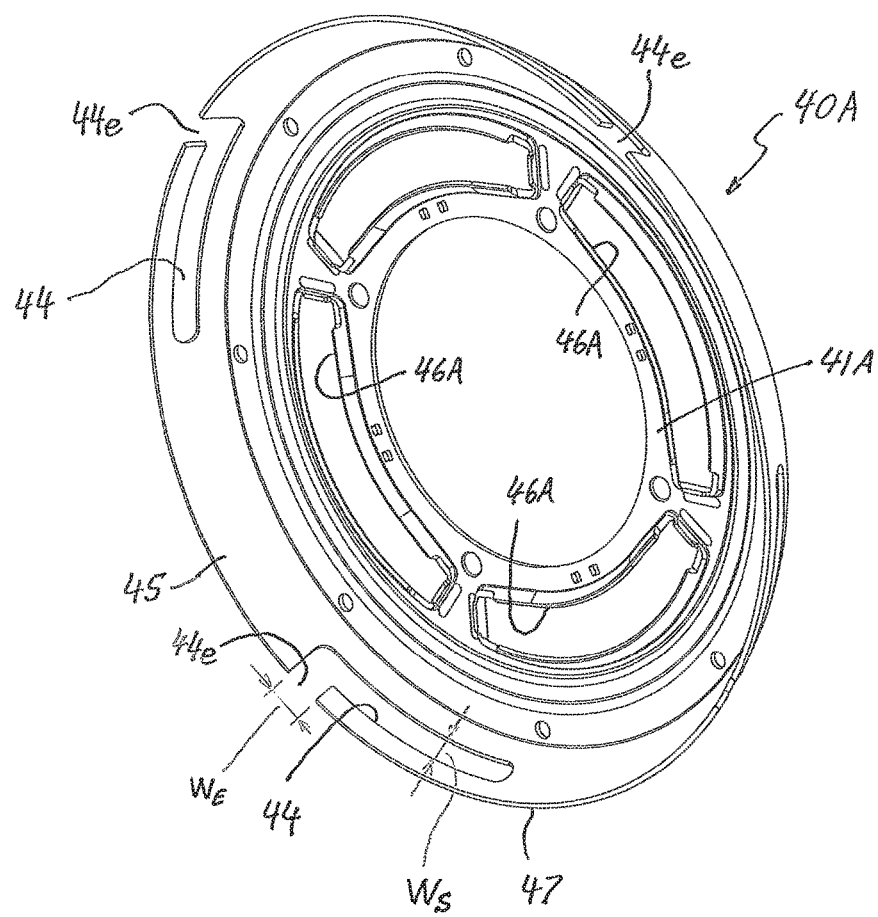

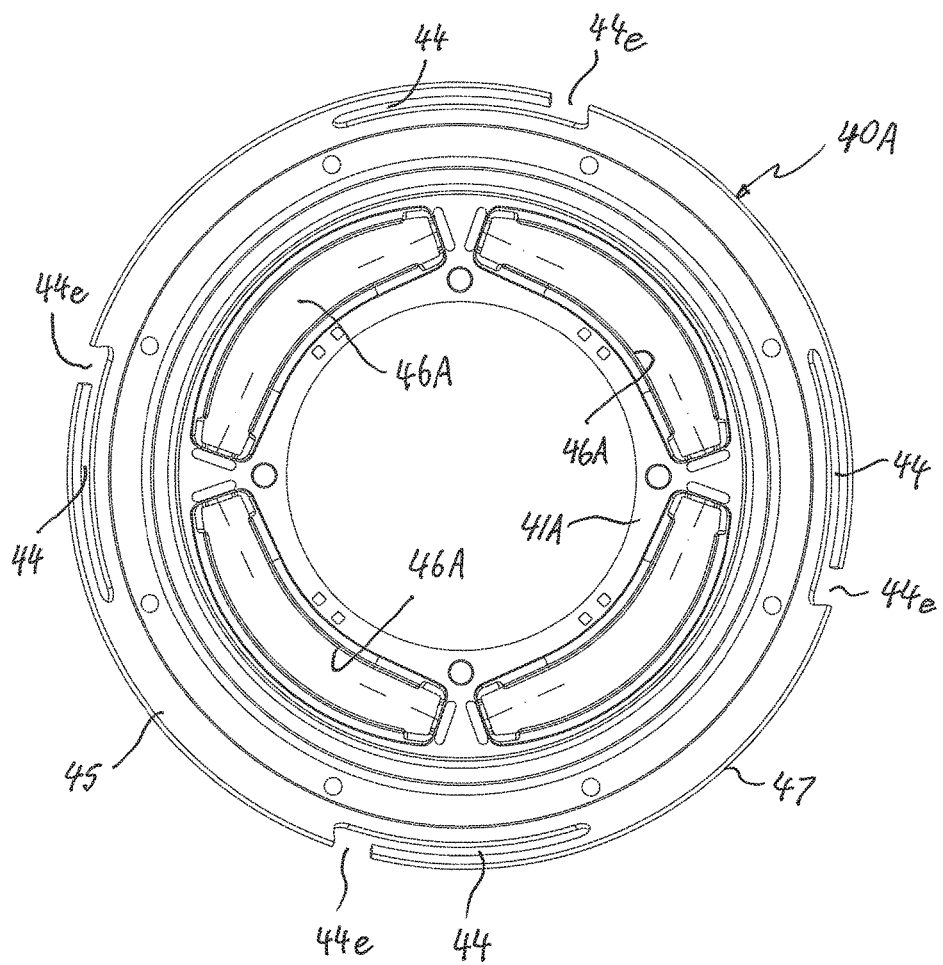

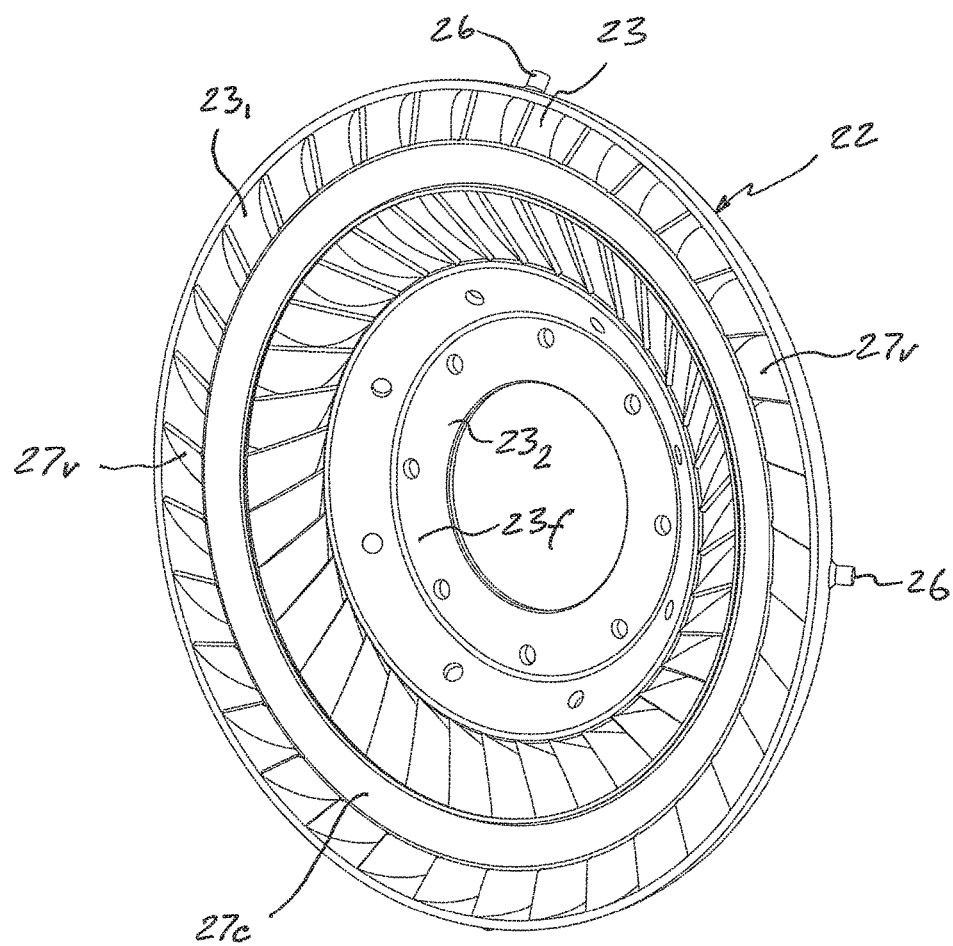

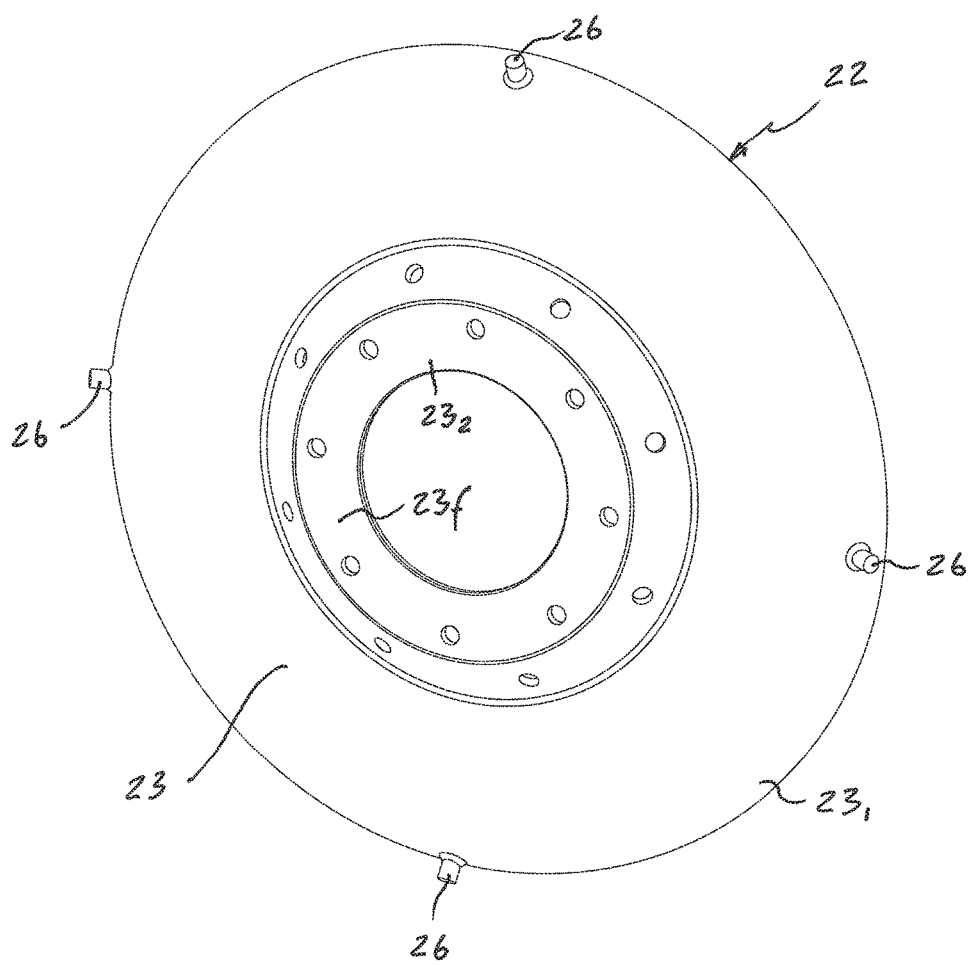

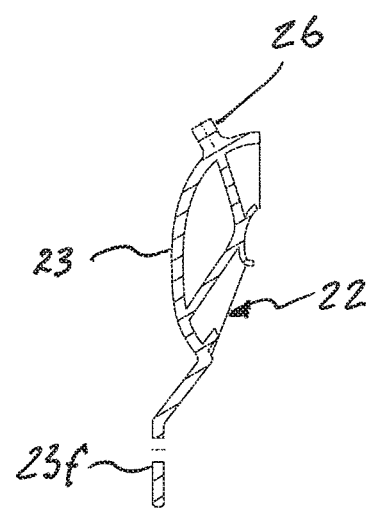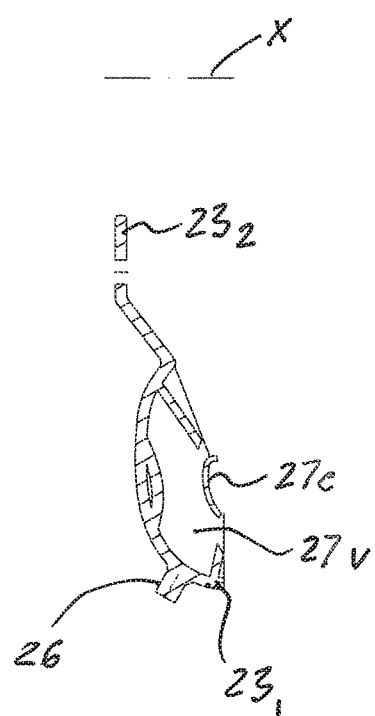
Fig. 11

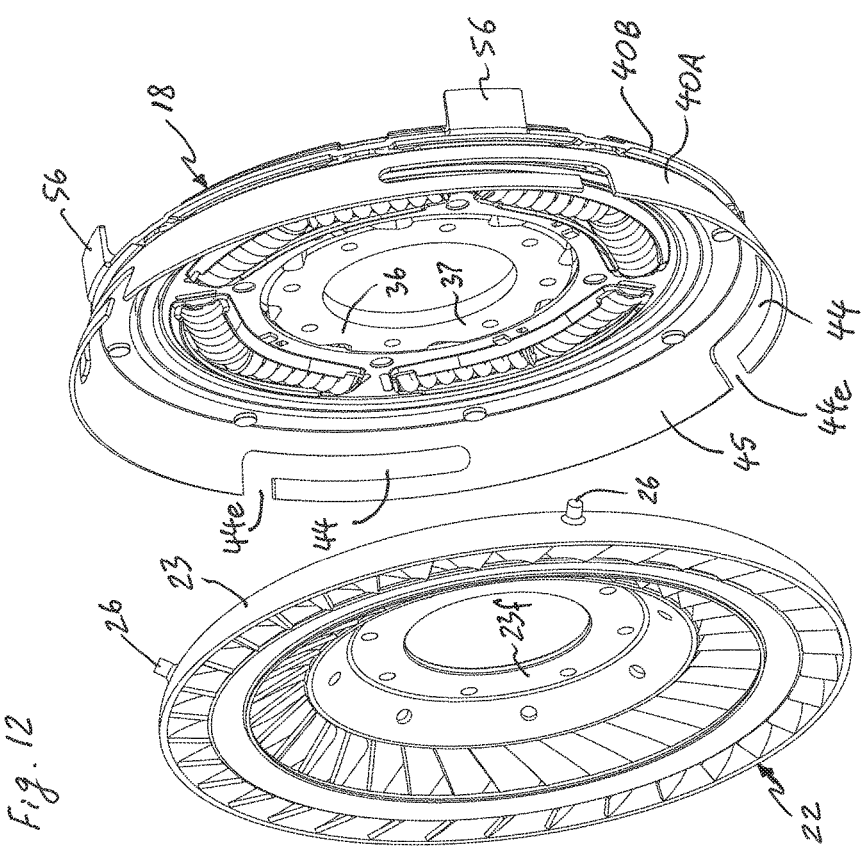
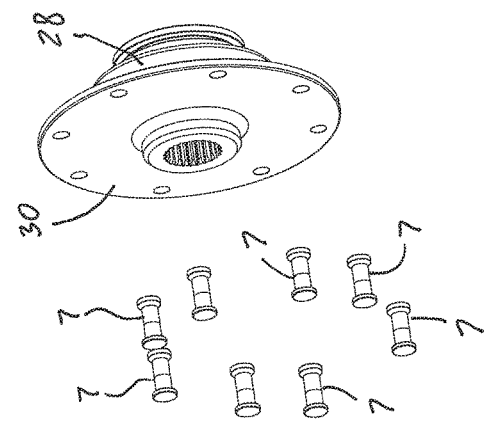
Fig. 12

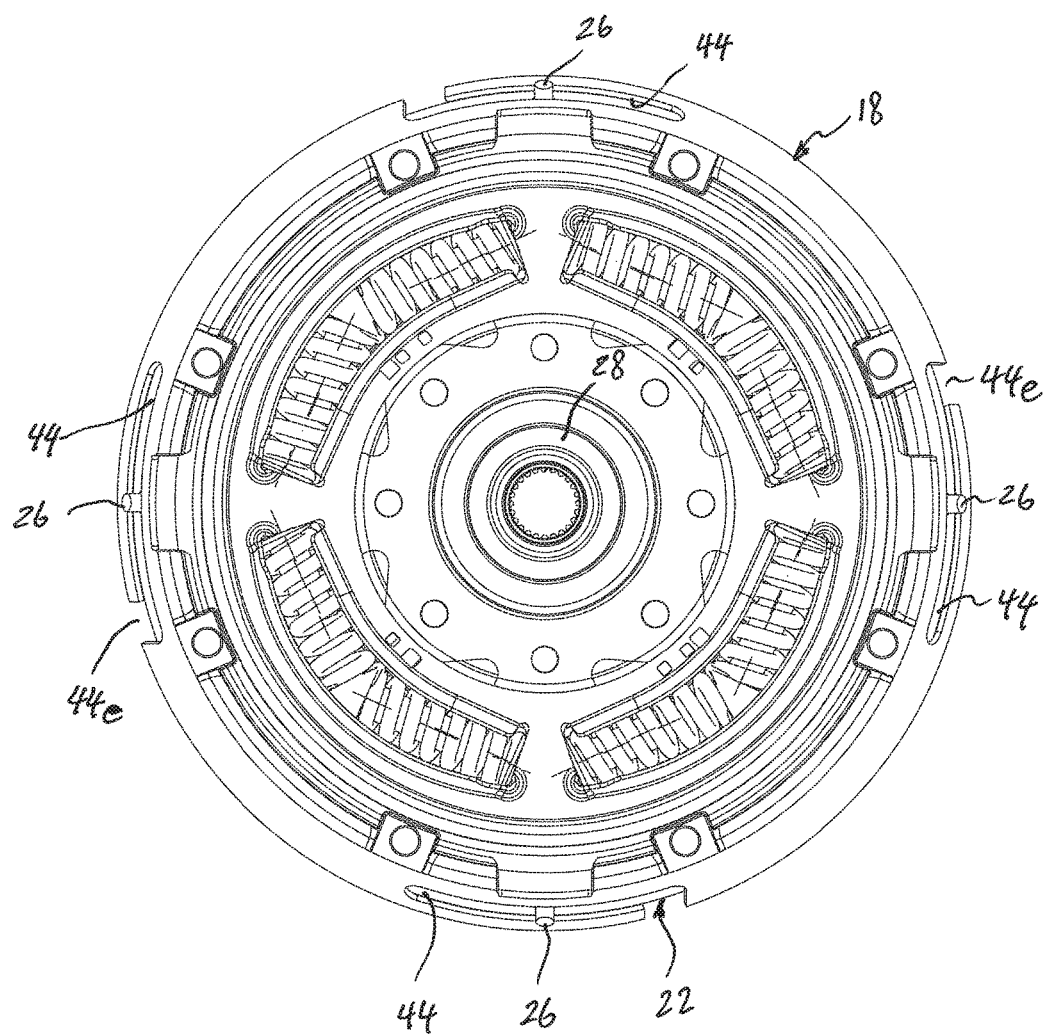

HYDROKINETIC TORQUE COUPLING DEVICE WITH TURBINE MADE OF LIGHTWEIGHT MATERIAL AND TORSIONAL VIBRATION DAMPER

BACKGROUND OF THE INVENTION

1. Field of the Invention

The present invention generally relates to hydrokinetic torque-coupling devices, and more particularly to a hydrokinetic torque-coupling device including a turbine wheel made of lightweight material having high coefficient of expansion.

2. Background of the Invention

An internal combustion engine exhibits irregularities (vibrations) due to the succession of combustion events in the engine cylinders. The vibrations preferably are damped before they enter the transmission and produce what may be considered unacceptably troublesome noise. To accomplish damping, it is known to interpose a torsion damping device between a drive shaft and a transmission (or driven) shaft. Torsion damping devices allow these irregularities to be filtered before the drive torque is transmitted to an automotive transmission. The torsion damping device is typically arranged in a hydrokinetic torque coupling device that allows temporary rotational connection of the drive shaft to the transmission shaft.

Normally, a hydrokinetic torque coupling device includes a hydrodynamic torque converter and a torsion damping device positioned between an axially oriented coaxial drive shaft and a driven shaft of the automotive transmission. A torque converter of this kind typically has a rotating casing that is capable of transmitting drive torque to the torsion damping device by means of a friction locking clutch, traditionally called a lock-up clutch. The torque converter also usually has a turbine wheel mounted rotatably inside the casing.

The torsion damping device includes a torque input element and a torque output element, and frequently circumferentially acting elastic members. The circumferentially acting elastic members are interposed between the torque input element and the torque output element. In so-called "long travel" damping devices, the elastic members are mounted, in groups of at least two elastic members, in series between the input element and output element.

For some applications, the torsion damping device may also include a dynamic absorber (or dynamic damper) having a heavy inertia member. A dynamic absorber having a heavy inertia member is arranged around the rotation axis of the engine shaft and is free to oscillate around an axis substantially parallel to the rotation axis of the engine shaft. The dynamic absorber is provided to lower a resonance frequency at low rotational speed of the engine and further improve the vibration damping performance. When, for example, a 3-cylinder engine goes to a deactivated cylinder mode (i.e., when one cylinder is deactivated), it generates a specific acyclic behavior. For a 3-cylinder engine, which is deactivated to 2 cylinders, the best solution is a dynamic damper without hysteresis. However, the dynamic damper requires a lot of space because of the needed inertia member. It that event, an outer damper of a torsion damping device (torsional vibration damper) has to be reduced in size or removed.

While hydrokinetic torque coupling devices and torsion damping devices or torsion damping devices with dynamic absorbers, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a hydrokinetic torque-coupling device for coupling together a driving shaft and a driven shaft. The hydrokinetic torque-coupling device of the present invention comprises an impeller wheel coaxially aligned with a rotation axis, a turbine wheel coaxially aligned with and drivable by the impeller wheel, a torsional vibration damper, and a turbine hub non-rotatably connected to the turbine wheel. The turbine wheel includes a turbine shell and at least one coupling pin formed integrally with the turbine shell and extending radially outwardly from an outer peripheral surface of the turbine shell. The torsional vibration damper comprises a first damper retainer rotatable about the rotation axis, a driven member rotatable relative to the first damper retainer coaxially with the rotation axis, and a plurality of damper elastic members interposed between the first damper retainer and the driven member. The damper elastic members elastically couple the first damper retainer to the driven member. The turbine hub is non-rotatably coupled to the driven member of the torsional vibration damper. The first damper retainer has at least one angularly extending bayonet slot configured to receive the at least one coupling pin therein, such that the at least one coupling pin is angularly moveable in the at least one bayonet slot relative to the first damper retainer.

According to a second aspect of the present invention, there is provided a method for assembling a hydrokinetic torque-coupling device for coupling together a driving shaft and a driven shaft. The method of the present invention comprises the steps of providing a turbine hub, providing a preassembled turbine wheel, providing at least partially preassembled torsional vibration damper including a first damper retainer formed with at least one angularly extending bayonet slot configured to receive the at least one coupling pin therein, a driven member rotatable relative to the first damper retainer coaxially therewith, and a plurality of damper elastic members interposed between the first damper retainer and the driven member for elastically coupling the first damper retainer to the driven member. The turbine wheel includes a turbine shell and is formed with at least one coupling pin formed integrally with the turbine shell and extending radially outwardly from an outer peripheral surface of the turbine shell. The method of the present invention further comprises the steps of mounting the turbine wheel to the at least partially preassembled torsional vibration damper so that the at least one coupling pin is placed angularly in the middle of the at least one bayonet slot, and non-rotatably securing the turbine wheel and the at least partially preassembled torsional vibration damper to the turbine hub.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 6 is a partial fragmentary cross-sectional half-view of the turbine wheel with the torsional vibration damper taken along the line 6-6 in FIG. 5;

FIG. 7 is a perspective view of a first retainer plate of the torsional vibration damper of the hydrodynamic torque-coupling device in accordance with the exemplary embodiment of the present invention;

FIG. 8 is a front plan view of the first retainer plate of the torsional vibration damper in accordance with the exemplary embodiment of the present invention;

FIG. 9A is a fragmentary perspective view of the turbine wheel in accordance with the exemplary embodiment of the present invention from the front side;

FIG. 9B is a fragmentary perspective view of the turbine wheel in accordance with the exemplary embodiment of the present invention from the rear side;

FIG. 11 is a partial fragmentary cross-sectional half-view of the turbine wheel taken along the line 11-11 in FIG. 10;

FIG. 12 is an exploded perspective view of the hydrokinetic torque-coupling device showing a turbine hub, and the preassembled turbine wheel and torsional vibration damper in accordance with the exemplary embodiment of the present invention prepared for assembling;

Figure 13:
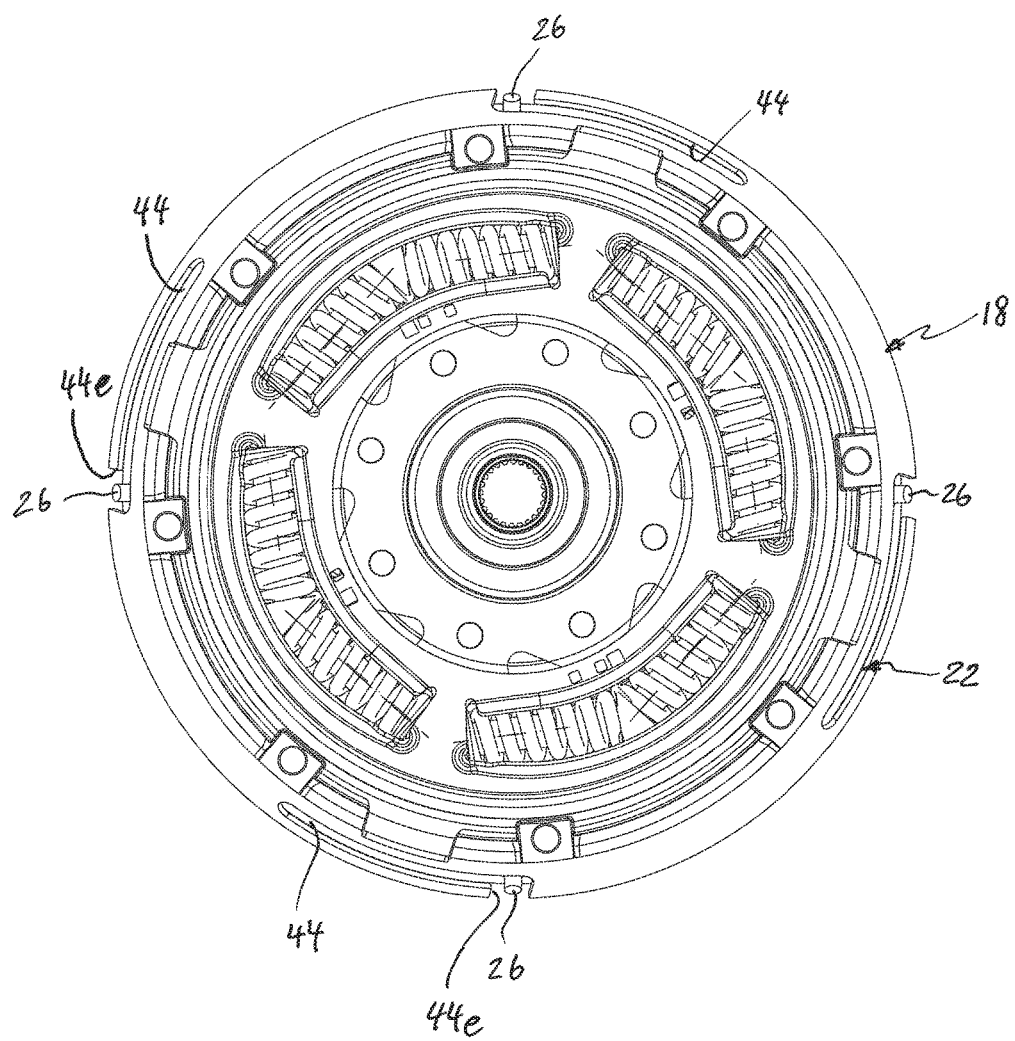

FIG. 13 is a front plan view of the preassembled turbine wheel with coupling pins inserted into entry ports of bayonet slots of the preassembled torsional vibration damper; and FIG. 14 is a front plan view of the preassembled turbine wheel mounted to the preassembled torsional vibration damper so that the coupling pins are disposed in the bayonet slots of the preassembled torsional vibration damper.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

Figure 1:
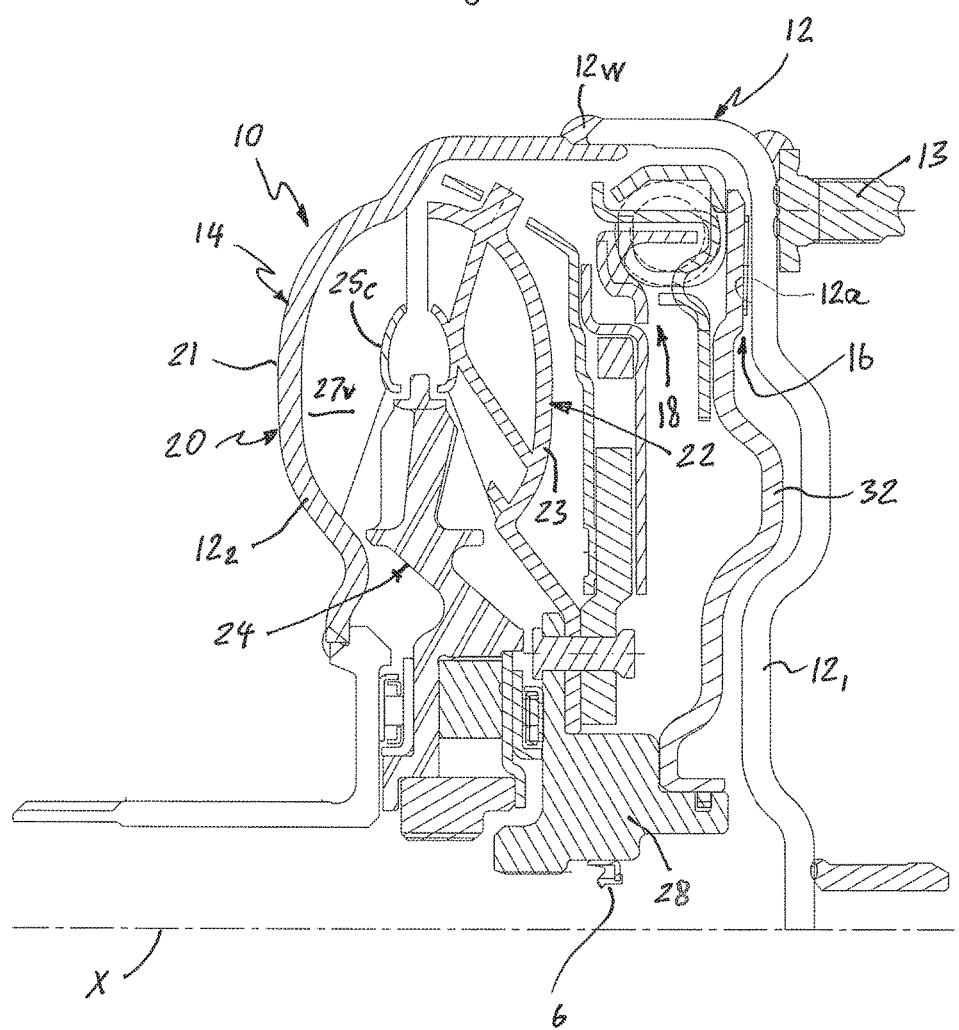
FIG. 1 is a fragmented half-view in axial section of a hydrokinetic torque-coupling device in accordance with an exemplary embodiment of the present invention.

An exemplary embodiment of a hydrokinetic torque-coupling device is generally represented in the accompanying drawings by reference numeral 10, as best shown in the fragmentary sectional view in FIG. 1. The hydrokinetic torque-coupling device 10 is operable in known manner to fluidly couple a driving shaft and a driven shaft of a motor vehicle, such as of an automobile. In the typical case, the driving shaft is an output shaft (or crankshaft) of an internal combustion engine of the motor vehicle, and the driven shaft is connected to an automatic transmission of the motor vehicle. The internal combustion engine also conventionally includes a flexplate non-rotatably coupled (i.e., fixed) to the driving shaft. The term "flexplate" (or "flex plate") is known in the automotive art as a metal disk that connects the output from an engine to the input of a hydrokinetic torque coupling device in a vehicle equipped with an automatic transmission. It takes the place of the flywheel found in a conventional manual transmission setup. Like flywheels, flexplates normally may couple to a starter motor via teeth formed along an outer edge of the flexplate.

The hydrokinetic torque-coupling device 10 comprises a sealed casing 12 filled with oil and rotatable about a rotation axis X. The hydrokinetic torque coupling device 10 further comprises a hydrodynamic torque converter 14, a lock-up clutch 16, and a torsional vibration damper 18, all disposed in the sealed casing 12. The torsional vibration damper 18 is mounted to the torque converter 14. Hereinafter the axial and radial orientations are considered with respect to the rotation axis X of the torque-coupling device 10.

The sealed casing 12, the torque converter 14, the lock-up clutch 16 and the torsional vibration damper 18 are all rotatable about the rotation axis X. The sealed casing 12 according to the present invention as illustrated in FIG. 1 includes a first casing (or cover) shell $12_1$ and a second casing (or impeller) shell $12_2$ disposed coaxially with and axially opposite to the first casing shell $12_1$. The first and second casing shells $12_1$, $12_2$ are non-movably (i.e., fixedly) interconnected sealingly together, such as by weld 12w about their outer peripheries. The first casing shell $12_1$ is non-movably (i.e., fixedly) connected to the driving shaft, more typically to the flexplate that is non-rotatably fixed to the driving shaft, so that the casing 12 turns at the same speed at which the engine operates for transmitting torque. Specifically, in the illustrated embodiment of FIG. 1 the casing 12 is rotatably driven by the internal combustion engine and is non-rotatably coupled to the flexplate with stud bolts 13. As best shown in FIG. 1, the stud bolts 13 are fixedly secured, such as by welding, to the first casing shell $12_1$. Each of the first and second casing shells $12_1$, $12_2$ may be made, for example, integrally by press-forming one-piece metal sheets.

The torque converter 14 comprises an impeller wheel 20, a turbine wheel 22, and a reactor (or stator) 24 interposed axially between the impeller wheel 20 and the turbine wheel 22. The impeller wheel 20 includes a substantially annular, semi-toroidal (or concave) impeller shell 21, a substantially annular impeller core ring 25c, and a plurality of impeller blades 25v fixedly (i.e., non-moveably) attached, such as by brazing, to the impeller shell 21 and the impeller core ring 25c, as best shown in FIG. 1. As further shown in FIG. 1, at least a portion of the second casing shell $12_2$ of the casing 12 forms and serves as the impeller shell 21 of the impeller wheel 20. Accordingly, the impeller shell 21 sometimes is referred to as part of the casing 12. The impeller wheel 20, including the impeller shell 21, the impeller core ring 25c and the impeller blades 25v, are non-rotatably secured to the second shell $12_2$ and hence to the driving shaft (or flywheel) of the engine to rotate at the same speed as the engine output. The impeller shell 21, the impeller core ring 25c and the impeller blades 25v may be conventionally formed by stamping from steel blanks.

The turbine wheel 22, as best shown in FIGS. 1, 3, 9A and 10, comprises a substantially annular, semi-toroidal (or concave) turbine shell 23 rotatable about the rotation axis X, a substantially annular turbine core ring 27c, and a plurality of turbine blades 27v non-moveable relative to the turbine shell 23 and the turbine core ring 27c. The turbine wheel 22 according to the exemplary embodiment of the present invention is made of lightweight material, such as plastic (e.g., a polyetheretherketone (PEEK) thermoplastic polymer, phenolic polymer, polyamide-imide amorphous polymer, such as Torlon® polyamide-imide, carbon fiber filament (CFF), magnesium alloy, etc., such as by molding. It should be understood that the lightweight material is a material having a volumetric mass density lower than that of steel. However, the tensile strength of the above-mentioned lightweight material is lower at high operating temperatures (about 170° C.) of the torque converter 14, and deformation of the turbine wheel 22 made of the lightweight material is higher than those of steel. The operating temperature of the torque converter 14 varies in a range between −40° C. and 140° C. Moreover, the turbine wheel 22, made of lightweight material, can interfere with the impeller shell 21 at some speeds due to axial deformation of the turbine shell 23. In addition, the lightweight material of the turbine wheel 22 has a higher coefficient of thermal expansion than steel.

Figure 2:
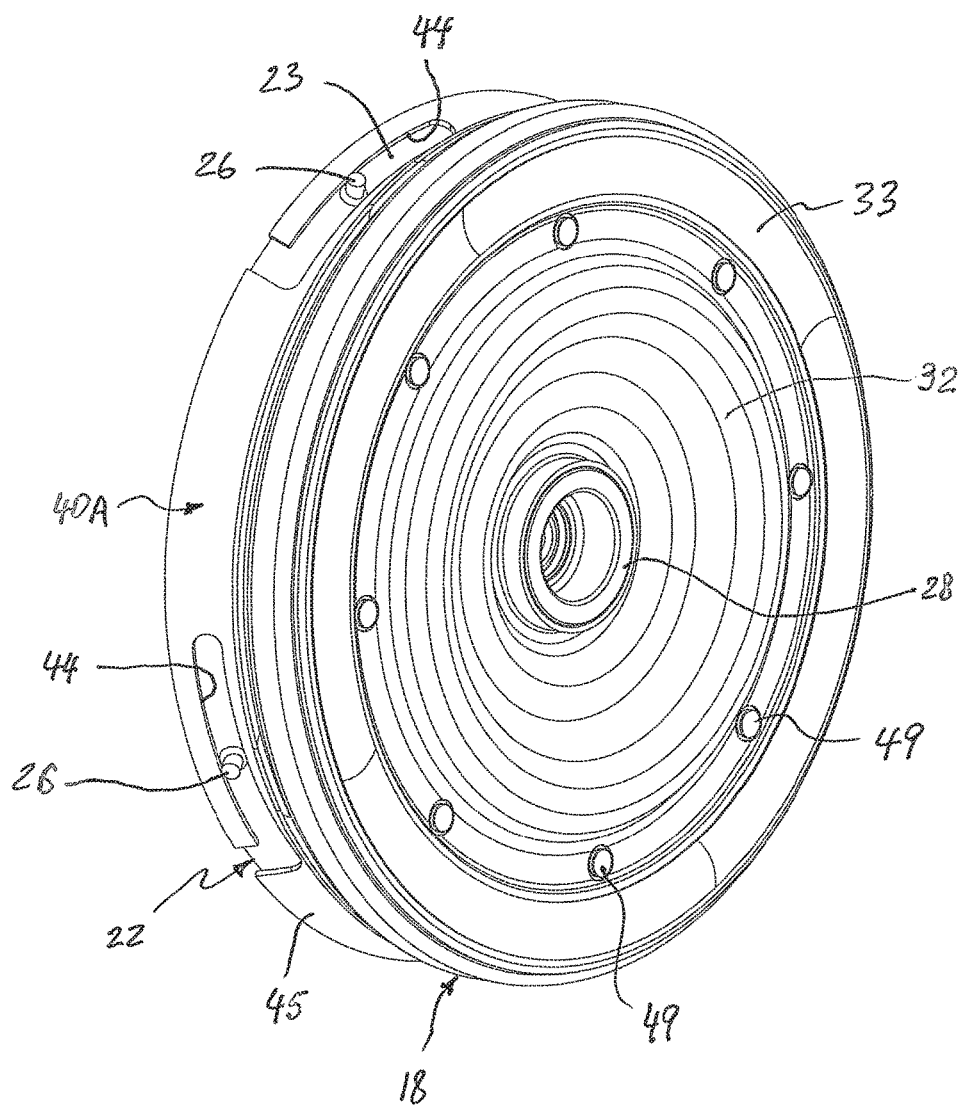
FIG. 2 is a perspective view of a turbine wheel of a hydrodynamic torque converter with a torsional vibration damper of the hydrokinetic torque-coupling device in accordance with the exemplary embodiment of the present invention.
Figure 3:
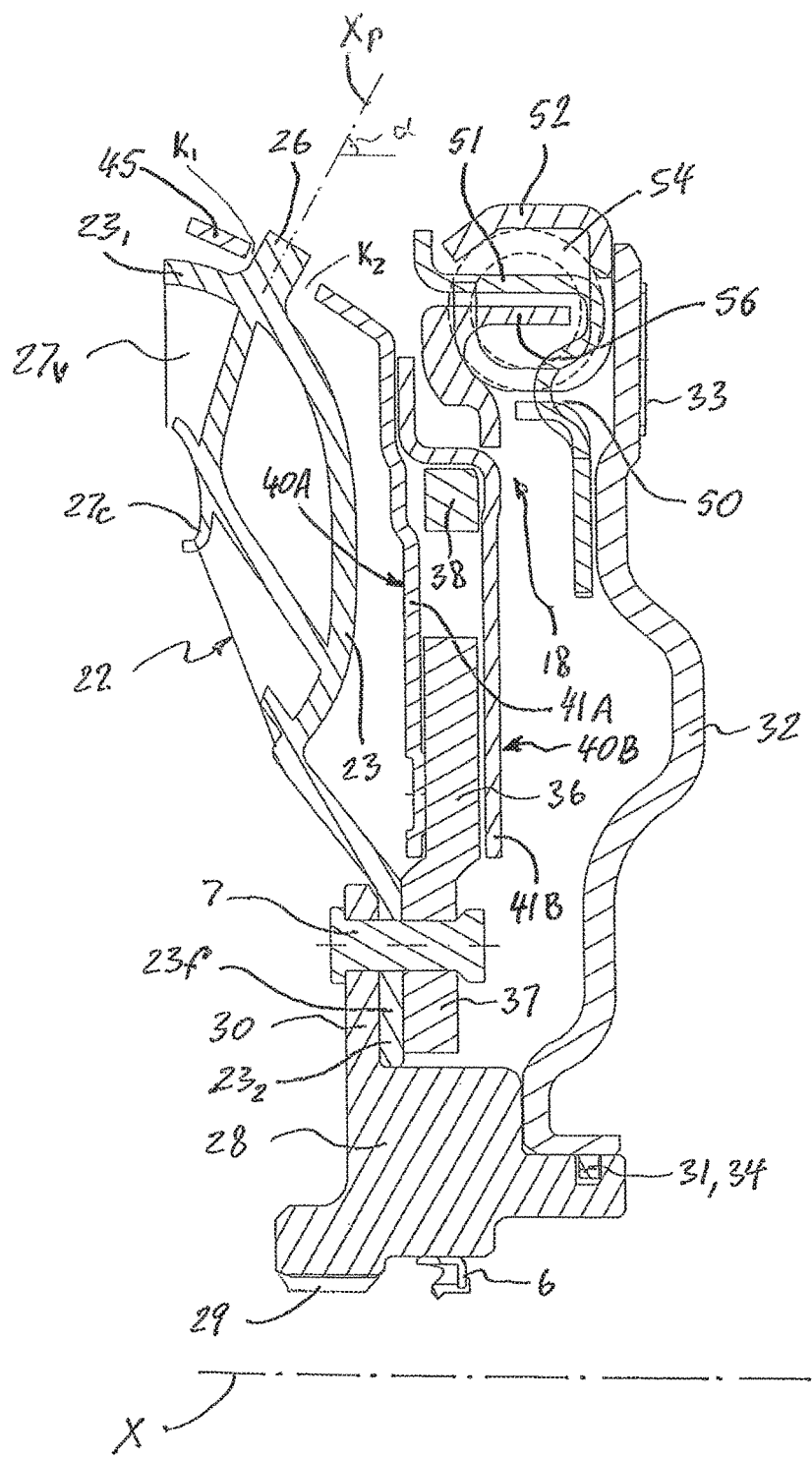
FIG. 3 is a fragmentary cross-sectional half-view of the turbine wheel of the hydrodynamic torque converter and the torsional vibration damper of the hydrokinetic torque-coupling device shown in FIG. 2.
Figure 4A:
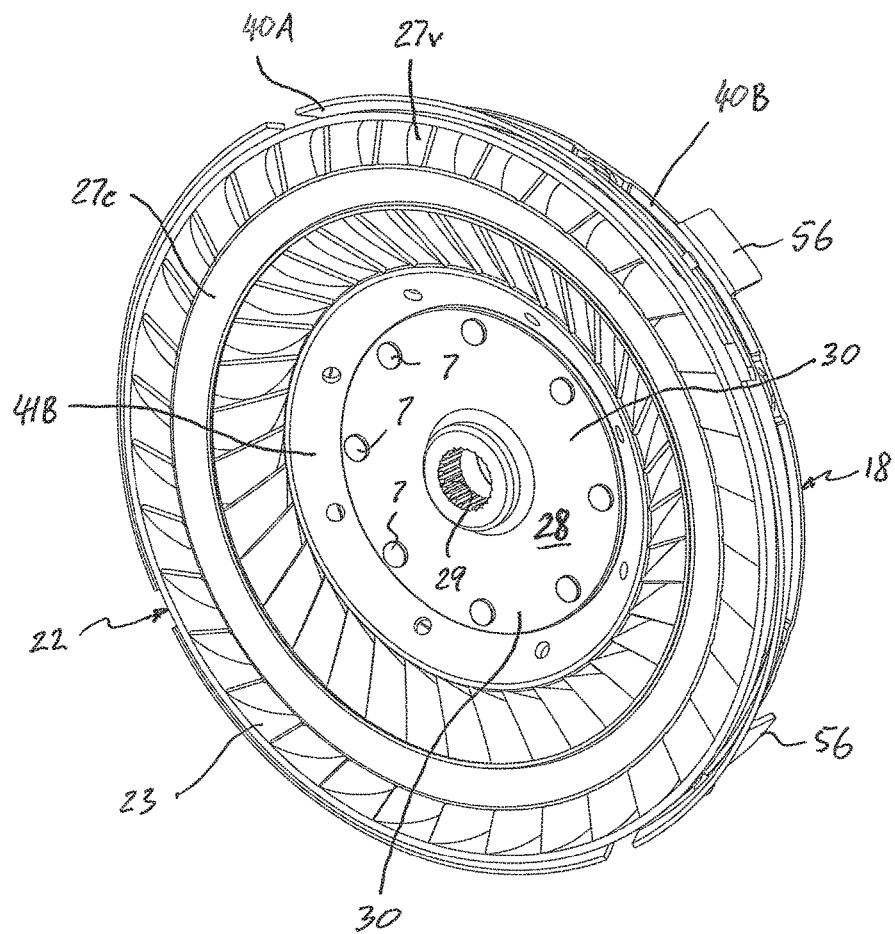
FIG. 4A is a fragmentary perspective view of the turbine wheel with the torsional vibration damper in accordance with the exemplary embodiment of the present invention from the front side of the turbine wheel, shown without a locking piston of a lock-up clutch.
Figure 4B:
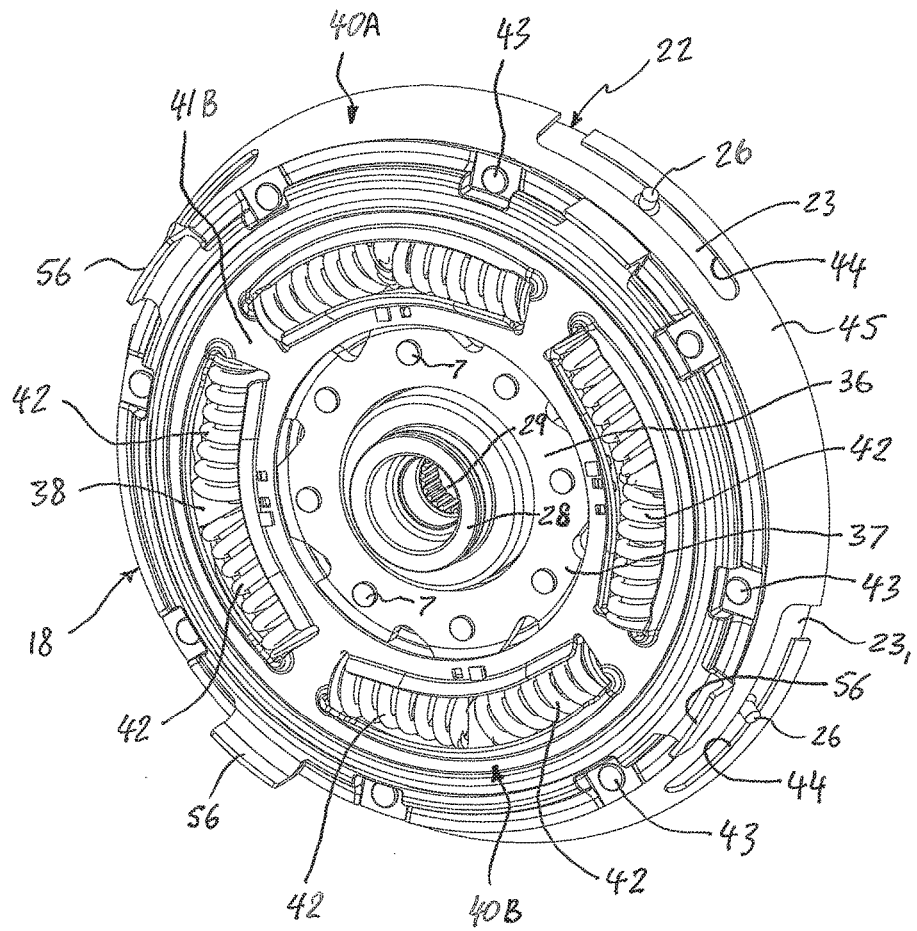
FIG. 4B is a fragmentary perspective view of the turbine wheel with the torsional vibration damper in accordance with the exemplary embodiment of the present invention from the rear side of the turbine wheel, shown without the locking piston of the lock-up clutch.
Figure 5:
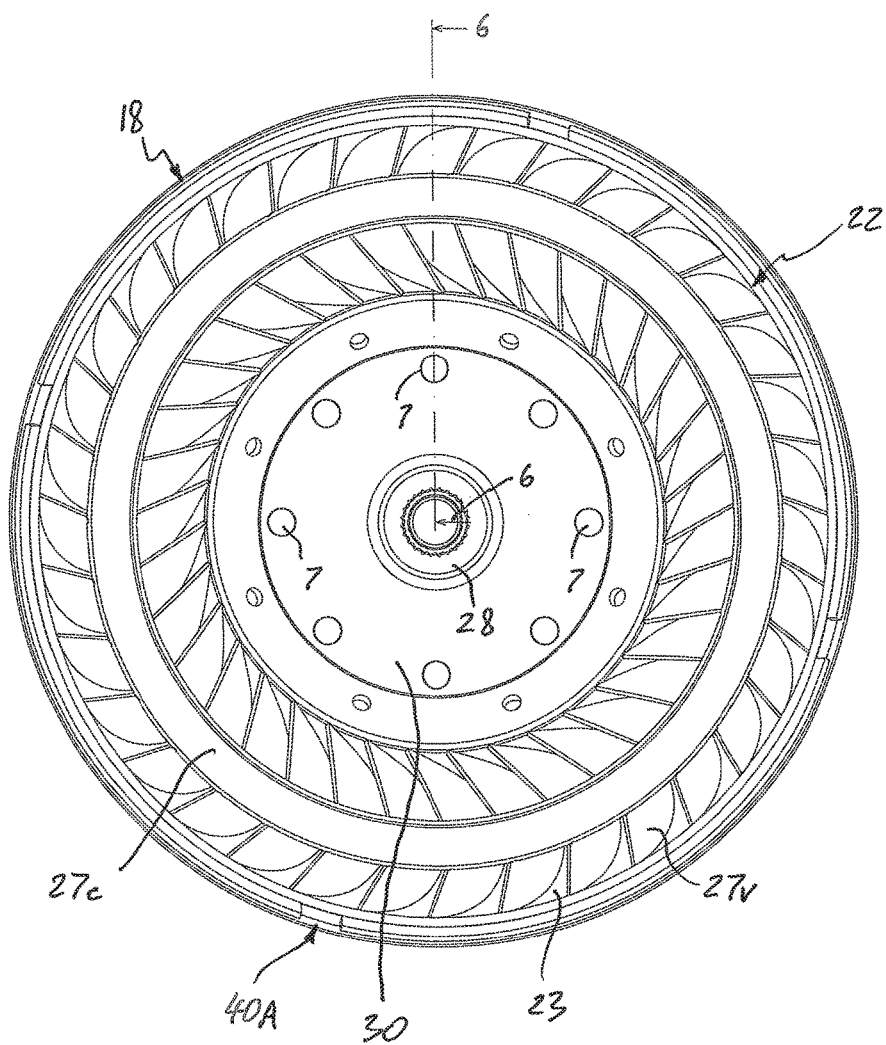
FIG. 5 is a front plan view of the turbine wheel with the torsional vibration damper of the hydrokinetic torque-coupling device in accordance with the exemplary embodiment of the present invention.
Figure 10:
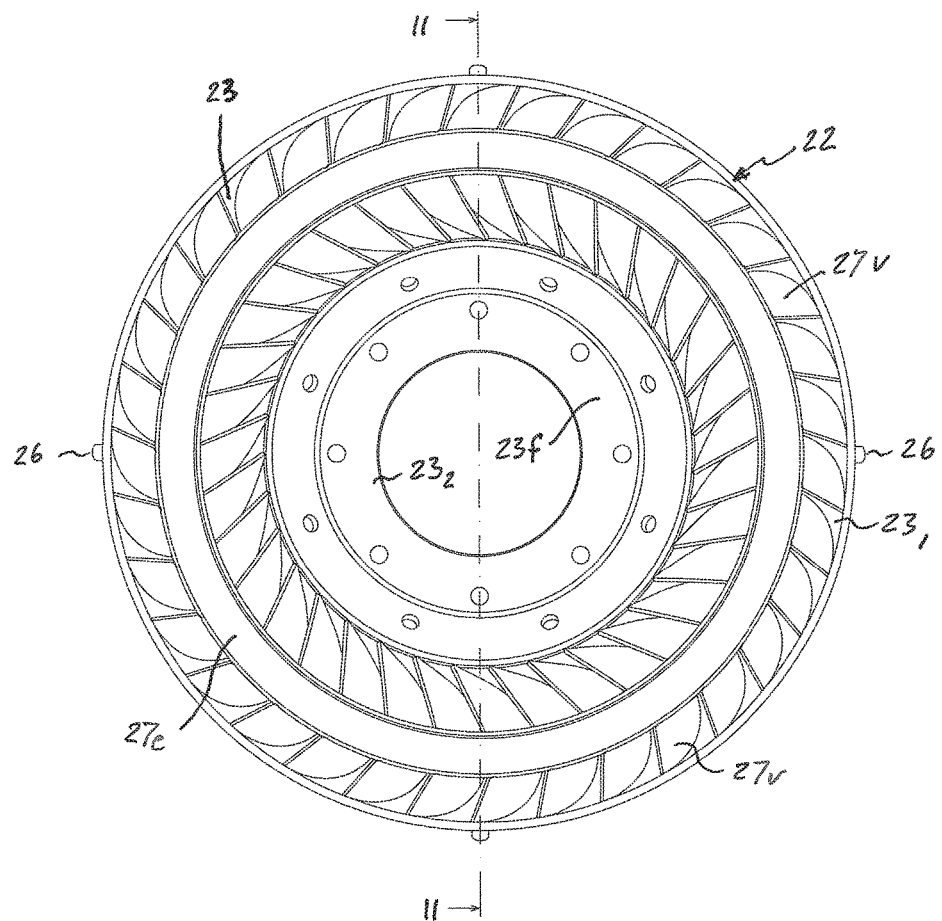
FIG. 10 is a front plan view of the turbine wheel in accordance with the exemplary embodiment of the present invention.

Furthermore, the turbine wheel 22 according to the exemplary embodiment of the present invention has at least one and preferably four (4) substantially identical coupling pins 26 extending radially outwardly from an outer peripheral surface of the turbine shell 23. According to the exemplary embodiment, as best shown in FIGS. 2, 3, 4B, 9A, 9B and 11, the coupling pins 26 are disposed at or adjacent to a radially outer end $23_1$ of the turbine wheel 22. Alternatively, the coupling pins 26 may be disposed anywhere on the outer peripheral surface of the turbine shell 23 of the turbine wheel 22. The number of coupling pins 26 can be more or less than four depending on axial load of the turbine wheel 22. The coupling pins 26 are preferably integral (or unitary) with (i.e., made as a single part or as a part made of separate components fixedly (i.e., non-moveably) connected together) the turbine shell 23, as best shown in FIGS. 2, 3 and 4B. Preferably, as best shown in FIGS. 3, 6 and 11, the coupling pins 26 are formed unitary with the turbine wheel 22 as a single-piece component. Alternatively, the coupling pins 26 can be made of steel, then over-molded with the lightweight plastic or magnesium alloy of the turbine shell material. As best shown in FIG. 9B, the coupling pins 26 are equiangularly spaced from each other. Moreover, a central axis $X_P$ of each of the coupling pins 26 extends radially outwardly from an outer peripheral surface of the turbine shell 23 at an oblique angle of inclination a relative to the rotation axis X, as best shown in FIGS. 3, 6 and 11. The angle of inclination a is defined by stiffness and deformation of the turbine wheel 22 estimated by Finite Element Analysis (FEA) calculation. According to the exemplary embodiment of the present invention, the angle of inclination a relative to the rotation axis X is in a range of from 10° to 90°, such as 60°, as illustrated in FIGS. 3 and 6. According to the exemplary embodiment of the present invention, the coupling pins 26 have a cylindrical shape (i.e., circular shape in cross-section), as best shown in FIGS. 2, 4B, 9A and 9B. Alternatively, the coupling pins 26 may have any other shape in cross-section, like oval, triangular or any other feasible shape.

The torque converter 14 of the torque coupling device 10 also includes a substantially annular turbine (or output) hub 28 rotatable about the rotation axis X, which is arranged to non-rotatably couple together the driven shaft and the turbine wheel 22. The turbine hub 28, as best shown in FIG. 3, has an integrally formed and radially outwardly extending substantially annular flange 30. The turbine wheel 22, as best shown in FIG. 3, has a substantially annular turbine flange 23f integrally formed with the turbine shell 23 and extending radially inwardly at a radially inner end 232 of the turbine wheel 22. The turbine flange 23f of the turbine wheel 22 is non-movably (i.e., fixedly) secured to the flange 30 of the turbine hub 28 by appropriate means, such as by rivets 7 or welding. The turbine hub 28 has internal splines 29 and is non-rotatably coupled to the driven shaft, such as an input shaft of the automatic transmission of the motor vehicle, which is provided with complementary external splines. Alternatively, a weld or other connection may be used to fix (i.e., non-movably secure) the turbine hub 28 to the driven shaft. The turbine hub 28 is rotatable about the rotation axis X and is coaxial with the driven shaft to center the turbine wheel 22 on the driven shaft. A sealing member 6 (shown in FIGS. 1 and 3), mounted to a radially inner peripheral surface of the turbine hub 28, creates a seal at the interface of the transmission input shaft and the turbine hub 28.

The lock-up clutch 16 is provided for selectively locking the driving and driven shafts. The lock-up clutch 16 is generally activated after starting of the motor vehicle and after hydraulic coupling of the driving and driven shafts, in order to avoid the loss of efficiency caused in particular by slip phenomena between the turbine wheel 22 and the impeller wheel 20. Specifically, the lock-up clutch 16 is provided to bypass the turbine wheel 22 when in a locked position. When the lock-up clutch 16 is in the locked (engaged) position, the engine torque is transmitted by the casing 12 to the turbine hub 28 through the torsional vibration damper assembly 20.

The lock-up clutch 16 includes a substantially annular locking piston 32, including an annular friction liner 33 fixedly attached to an axially outer surface of the locking piston 32 that faces a substantially radial locking wall 12a of the casing 12 (shown in FIG. 1) by appropriate means known in the art, such as by adhesive bonding. As best shown in FIG. 3, the friction liner 33 is fixedly attached to the axially outer surface of the locking piston 32 at a radially outer peripheral end thereof. The locking piston 32 is slidably mounted to the turbine hub 28 for axially reciprocating movement thereon. The locking piston 32 is axially displaceable toward (the locked (or engaged) position of the lock-up clutch 16) and away (an open (or disengaged) position of the lock-up clutch 16) from the locking wall 12a inside the casing 12. Moreover, the locking piston 32 is axially displaceable away from (the engaged (or locked) position of the lock-up clutch 16) and toward (the disengaged (or open) position of the lock-up clutch 16) the turbine hub 28. A radially outer surface of the turbine hub 28 includes an annular slot 31 for receiving a sealing member 34, such as an O-ring, as best shown in FIGS. 3 and 6. The locking piston 32 is mounted to slidingly engage the turbine hub 28 (which is splined with or mounted on the driven shaft) with the sealing member 34 therebetween.

The torsional vibration damper 18 advantageously allows the impeller wheel 20 of the torque converter 14 to be coupled, with torque damping, to the turbine hub 28, and thus to the input shaft of the automatic transmission. The torsional vibration damper 18 also allows damping of stresses between a first (or drive) shaft and a second (or driven) shaft that are coaxial with the rotation axis X, with torsion damping.

The torsional vibration damper 18, as best shown in FIGS. 1 and 3, is disposed between the turbine hub 28 that is fixedly (i.e., non-movably) connected with the turbine shell 23 of the turbine wheel 22, and the locking piston 32 of the lock-up clutch 16. Moreover, the locking piston 32 of the lock-up clutch 16 is rotatably coupled to the turbine wheel 22 and the turbine hub 28 by the torsional vibration damper 18. The torsional vibration damper 18 is arranged on the turbine hub 28 in a movable and centered manner. The turbine hub 28 forms an output part of the torque converter 14 and torsional vibration damper 18, and a driven side of the torque-coupling device 10, and is splined with the driven shaft. The locking piston 32, on the other hand, forms an input part of the torsional vibration damper 18.

During vehicle operation, when the lock-up clutch 16 is in the disengaged (open) position, the engine torque is transmitted by the turbine wheel 22 of the torque converter 14 from the impeller wheel 20 to the turbine hub 28 bypassing the torsional vibration damper 18. However, when the lock-up clutch 16 is in the engaged (locked) position, the engine torque is transmitted by the casing 12 to the turbine hub 28 through the torsional vibration damper 18, bypassing the turbine wheel 22. As best shown in FIGS. 1 and 3, the torsional vibration damper 18 is operatively coupled to the turbine wheel 22 and the turbine hub 28 of the torque converter 14.

The torsional vibration damper 18 comprises a substantially annular driven member 36 fixedly (i.e., non-movably) secured to the turbine hub 28, and a substantially annular intermediate member 38 mounted about the driven member 36 and rotatably moveable relative thereto, as best shown in FIGS. 3 and 6. The driven member 36, as best shown in FIGS. 3 and 6, has an integrally formed and radially inwardly extending mounting flange 37. The mounting flange 37 of the driven member 36 is fixedly (i.e., non-movably) secured to the flange 30 of the turbine hub 28 by appropriate means, such as by the rivets 7 or welding. Thus, the turbine shell 23 of the turbine wheel 22 is fixedly secured to both the turbine hub 28 and the driven member 36 of the torsional vibration damper 18, such as by the rivets 7 or welding. The driven member 36 constitutes an output member of the torsional vibration damper 18.

The torsional vibration damper 18 further comprises a substantially annular first damper retainer 40A, a substantially annular second damper retainer 40B disposed axially opposite the first damper retainer 40A, and a plurality of circumferentially acting damper elastic members (or torque transmitting elements) 42 (also referred to herein as radially inner (or first) damper elastic members) disposed in series relative to each other between the driven member 36 and the first and second damper retainers 40A, 40B, as best shown in FIGS. 3 and 4B. The first and second damper retainers 40A, 40B are mounted adjacent to axially opposite sides (surfaces) of the driven member 36 and the intermediate member 38 so as to be oriented parallel to each other and coaxially with the rotation axis X. The first and second damper retainers 40A, 40B are non-movably (i.e., fixedly) secured to one another by appropriate means, such as by mechanical fasteners (such as rivets 43 best shown in FIG. 4B) or welding. Thus, the first and second damper retainers 40A, 40B are non-rotatable relative to one another, but rotatable relative to both the driven member 36 and the intermediate member 38 through the damper elastic members 42. In other words, the first and second damper retainers 40A, 40B are elastically coupled to both the driven member 36 and the intermediate member 38 through the damper elastic members 42. The first and second damper retainers 40A, 40B are preferably formed by stamping from steel blanks.

Further according to the exemplary embodiment, the first damper retainer 40A includes a generally radially oriented first retainer plate 41A and an outer flange 45 extending outwardly from the first retainer plate 41A at an angle generally orthogonal to the central axes $X_P$ of the coupling pins 26. Preferably, as best shown in FIGS. 3 and 6, the outer flange 45 of the first damper retainer 40A extends radially outwardly at an oblique angle relative to the rotation axis X. Specifically, the radially outer flange 45 of the first damper retainer 40A is inclined in a direction toward the coupling pins 26, while the coupling pins 26 are inclined in a direction toward the radially outer flange 45 of the first damper retainer 40A. Similarly, the second damper retainer 40B includes a generally radially oriented second retainer plate 41B substantially parallel to the first retainer plate 41A, as best shown in FIGS. 3 and 6.

Each of the damper elastic members 42 is disposed circumferentially in series between the driven member 36 and the first and second damper retainers 40A, 40B. Specifically, the damper elastic members 42 are interposed between the first and second damper retainer plates 41A, 41B of the first and second damper retainers 40A, 40B and the intermediate member 38, and between the intermediate member 38 and the driven member 36 in series, as best shown in FIG. 4B. Thus, the first and second damper retainers 40A, 40B are elastically coupled to the intermediate member 38 through the damper elastic members 42 interposed between the first and second retainer plates 41A, 41B and the intermediate member 38, and the intermediate member 38 is elastically coupled to the driven member 36 through the damper elastic members 42 interposed between the intermediate member 38 and the driven member 36.

According to the exemplary embodiment of the present invention, the damper elastic members 42 are identical to each other. In non-limiting fashion, the torsional vibration damper 18 according to the exemplary embodiment of the present invention has eight damper elastic members 42. Further according to the present invention, each of the damper elastic members 38 is in the form of helical (or coil) spring having a principal axis oriented substantially circumferentially. Further according to the exemplary embodiment of the present invention, each of the damper elastic members 42 includes only one helical spring. Alternatively, each of the damper elastic members 42 may include a pair of coaxial helical springs. Specifically, each of the damper elastic members 42 may include an external large-diameter spring and an internal smaller-diameter spring, arranged coaxially so that the internal spring is disposed within the external spring.

Moreover, the first and second damper retainers 40A, 40B are arranged axially on either side of the damper elastic members 42 and are operatively connected therewith. The first and second damper retainers 40A, 40B are non-movably (i.e., fixedly) secured to one another by appropriate means, such as by rivets or welding, so as to be rotatable relative to the driven member 36. Thus, the first and second damper retainers 40A, 40B are non-rotatable relative to one another, but rotatable relative to the driven member 36 and the intermediate member 38. Each of the damper elastic members 42 is disposed circumferentially between the driven member 36 and the intermediate member 38.

According to the exemplary embodiment of the present invention, as best shown in FIGS. 3, 4B, 7 and 8, each of the first and second damper retainers 40A, 40B is preferably a stamped integral member of suitable metallic construction, e.g., made as a single or unitary component, but may be separate components fixedly connected together.

According to the exemplary embodiment of the present invention as best illustrated in FIGS. 2, 4B, 7, 8 and 12, the first damper retainer 40A has at least one and preferably four (4) substantially identical bayonet slots 44 formed in the radially outer flange 45 of the first damper retainer 40A. The bayonet slots 44 extend angularly along a radially outer peripheral edge 47 of the first damper retainer 40A. Each of the bayonet slots 44 is configured to receive one of the coupling pins 26 therethrough. Thus, number of the bayonet slots 44 corresponds to the number of the coupling pins 26. As best shown in FIGS. 2, 3, 4B, 6, 7 and 8, the bayonet slots 44 are disposed in the radially outer flange 45 of the first damper retainer 40A.

Each of the bayonet slots 44 has an entry port 44e formed by an opening in the radially outer peripheral edge 47 of the first damper retainer 40A, as best shown in FIGS. 7 and 8. As best shown in FIGS. 6 and 7, a width Ws of each of the bayonet slots 44 in the radial direction and a width WE of the entry port 44e thereof in the circumferential direction, as best shown in FIG. 7, is each larger than a width $W_P$ of each of the coupling pins 26 in the radial direction. Accordingly, in an assembled condition, when the coupling pins 26 is disposed in the bayonet slots 44, as illustrated in FIG. 2, there are gaps $K_1$ and $K_2$ on radially and axially opposite sides of the coupling pins 26 between the coupling pins 26 and axially opposite sides of the bayonet slots 44 in the radially outer flange 45 of the first damper retainer 40A, as best shown in FIGS. 3 and 6. In other words, there is no rigid connection between the first damper retainer 40A and the coupling pins 26. The gaps $K_1$ and $K_2$ allow thermal expansion of the turbine wheel 22 made of lightweight material, such as plastic, magnesium alloy, etc.

The coupling pins 26 are angularly (i.e., circumferentially) moveable (i.e., rotatable or pivotable) in the bayonet slots 44 relative to the first damper retainer 40A. Moreover, the gaps $K_1$ and $K_2$ allow some axial movement of the radially outer end $23_1$ of the turbine wheel 22 made of lightweight material. As the first damper retainer 40A and the turbine wheel 22 rotate with the same speed, there is no torque transmission through the coupling pins 26.

In some conditions, however, the coupling pins 26 can axially engage the first damper retainer 40A in order to reduce axial deformation of the radially outer end $23_1$ of the turbine wheel 22. Axial load to the coupling pins 26 is higher in lower speed ratios of the torque converter 14. The axial load on the coupling pins 26 is higher at stall. Moreover, by varying the angle of inclination a of the coupling pins 26, the axial displacement of the radially outer end $23_1$ of the turbine wheel 22 can be controlled. Thus, the coupling pins 26 of the turbine wheel 22 inserted in the bayonet slots 44 of the first damper retainer 40A reduce the axial deformation of the radially outer end $23_1$ of the turbine wheel 22 made of the lightweight material having lower tensile strength at high operating temperatures of the torque converter 14 and higher coefficient of expansion than steel typically used in manufacturing a turbine wheel of a hydrodynamic torque converter.

Each of the first and second retainer plates 41A, 41B is provided with a plurality of circumferentially extending windows (or window-shaped openings) 46A, 46B, respectively, each of which is arranged in correspondence with a pair of the elastic damping members 42, as best depicted in FIGS. 4B, 7 and 8. The windows 46A, 46B are separated circumferentially from one another.

The torsional vibration damper 18 further comprises a substantially annular drive member 50 and a substantially annular connecting member 52 rotatably and elastically coupled to the drive member 50 (as best shown in FIG. 3). The driven member 36 is rotatably moveable relative to both the drive member 50 and the connecting member 52. The drive member 50 constitutes an input member of the torsional vibration damper 18, while the driven member 36 constitutes the output member of the torsional vibration damper 18. As best shown in FIGS. 1 and 3, the drive member 50, the connecting member 52 and the annular driven member 36 are coaxial with each other and rotatable about the rotation axis X. The drive member 50 is non-movably (i.e., fixedly) secured to the locking piston 32 by appropriate means, such as by rivets 49 (best shown in FIG. 2) or welding. The driven member 36 is operatively associated with the turbine wheel 22 and coaxial with the turbine hub 28. The turbine shell 23 of the turbine wheel 23 is fixedly secured to both the turbine hub 28 and the driven member 36 by any appropriate means, such as by the rivets 7 or welding.

The annular drive member 50 includes external (or peripheral), radially outwardly extending driving tabs (or abutment elements) 51 circumferentially equidistantly disposed about an outer periphery thereof, as best shown in FIG. 3. The drive member 50 with the driving tabs 51 is preferably an integral part, e.g., made as a single or unitary component, but may be separate components fixedly connected together. Preferably, the driving tabs 51 are integrally press-formed on the drive member 50 and are equiangularly spaced from each other.

The connecting member 52 includes internal, radially inwardly extending tabs (or abutment elements) circumferentially equiangularly disposed about an inner periphery thereof. The connecting member 52 is preferably a stamped member of suitable metallic construction with the inwardly extending tabs preferably being an integral part, e.g., made as a single or unitary component, but may be separate components fixedly connected together. Preferably, the inwardly extending tabs are integrally press-formed on the connecting member 52 and are equiangularly spaced from each other.

The torsional vibration damper 18 further comprises a plurality of ancillary damper elastic members (or torque transmitting elements) 54 (also referred to herein as radially outer (or second) damper elastic members), such as coil springs (damper springs) disposed in series relative to each other between the drive member 50 and the connecting member 52, as best shown in FIGS. 1 and 3. As best shown in FIGS. 1 and 3, the ancillary damper elastic members (or outer damper elastic members) 54 are disposed radially outwardly of the damper elastic members (or inner damper elastic members) 42. The radially outer damper elastic members 54 include circumferentially acting elastic members, such as coil springs, disposed in series relative to each other between the drive member 50 and the connecting member 52, as best shown in FIG. 3. The ancillary damper elastic members 54 are distributed circumferentially around the rotation axis X. As further illustrated in FIGS. 1 and 3, the radially inner and outer elastic damping members 42 and 54, respectively, are radially spaced from each other.

The connecting member 52 defines a substantially annular groove (or channel) that partially houses the ancillary damper elastic members 54, which are distributed about the circumference of the annular channel of the connecting member 52 to support the ancillary damper elastic members 54 against centrifugal force. Moreover, each of the ancillary damper elastic members 54 is disposed circumferentially between the driving tabs 51 of the drive member 50 and the internal tabs of the connecting member 52.

As best shown in FIGS. 3, 4A, 4B and 6, the second damper retainer 40B further includes one or more peripheral abutment elements 56 extending axially outwardly from the second retainer plate 41B away from the first damper retainer 40A toward the drive member 50 and the locking piston 32. According to the exemplary embodiment of the present invention, the abutment elements 56 are integrally press-formed with the second retainer plate 41B so as to be equiangularly spaced from each other. The abutment elements 56 have circumferentially opposite abutment surfaces on circumferential ends of the mutually facing abutment elements 56. The abutment elements 56 of the second damper retainer 40B engage the ancillary damper elastic members 54. Thus, the second damper retainer 40B is operatively and rotatably connected to the drive member 50 through the ancillary damper elastic members 54.

The radially outer damper elastic members 54 are held in the interface between the internal tabs of the connecting member 52, the driving tabs 51 of the drive member 50 and the abutment elements 56 of the second damper retainer 40B so as to transmit damped rotational torque from the locking piston 32 to the first and second damper retainers 40A, 40B through the radially outer damper elastic members 54 and the connecting member 52. As best shown in FIGS. 1 and 3, the driving tabs 51 of the drive member 50 and the abutment elements 56 of the second damper retainer 40B are radially and circumferentially (or angularly) aligned with each other. In other words, the connecting member 52 is drivingly connected to the first and second damper retainers 40A, 40B through the radially outer damper elastic members 54. In turn, the drive member 50 is drivingly connected to the connecting member 52 also through the radially outer damper elastic members 54. Thus, the radially outer damper elastic members 54 are disposed and compressible between the driving tabs 51 of the drive member 50 and the internal tabs of the connecting member 52, and between the internal tabs of the connecting member 52 and the abutment elements 56 of the second damper retainer 40B. In other words, the ancillary damper elastic members 54 elastically couple the second damper retainer 40B to the drive member 50.

During operation, when the lock-up clutch 16 is in the disengaged (open) position, the engine torque is transmitted from the impeller wheel 20 by the turbine wheel 22 of the torque converter 14 to the turbine hub 28. When the lock-up clutch 16 is in the engaged (locked) position (i.e., when the locking piston 32 is engaged (or locked) against the locking wall 12a of the casing 12 by action of the hydraulic pressure), the engine torque is transmitted by the casing 12 to the turbine hub 28 through the torsional vibration damper 18. Specifically, the drive member 50 is drivingly and elastically connected to the first and second damper retainers 40A, 40B through the connecting member 52 and the radially outer damper elastic members 54. In turn, the first and second damper retainers 40A, 40B are drivingly and elastically connected to the driven member 36 through the intermediate member 38 and the inner damper elastic members 42.

An exemplary method for assembling the hydrokinetic torque-coupling device 10 according to the exemplary embodiment will now be explained. It should be understood that this exemplary method may be practiced in connection with the other embodiments described herein. This exemplary method is not the exclusive method for assembling the hydrokinetic torque coupling devices described herein. While the method for assembling the hydrokinetic torque-coupling device 10 may be practiced by sequentially performing the steps as set forth below, it should be understood that the methods may involve performing the steps in different sequences.

The torque converter 14 including the impeller wheel 20, the turbine wheel 22 and the stator 24, and the torsional vibration damper 18 may each be preassembled, as shown in FIG. 12. The turbine wheel 22 is made of lightweight material, such as plastic, magnesium alloy, etc, by molding.

The turbine wheel 22 according to the exemplary embodiment of the present invention is formed with at least one and preferably four (4) substantially identical coupling pins 26 extending radially outwardly from an outer peripheral surface of the turbine shell 23, and disposed at or adjacent to a radially outer end $23_1$ of the turbine wheel 22. The coupling pins 26 are integral (or unitary) with (i.e., made as a single part or as a part made of separate components fixedly (i.e., non-moveably) connected together) the turbine shell 23, as best shown in FIGS. 2, 3 and 9B. Preferably, as best shown in FIGS. 3, 6 and 11, the coupling pins 26 are formed unitary with the turbine wheel 22 as a single-piece component. Alternatively, the coupling pins 26 can be made of steel, then over-molded with the lightweight plastic or magnesium alloy of the turbine shell material. The coupling pins 26 are equiangularly spaced from each other. Moreover, the coupling pins 26 extend radially outwardly from the outer peripheral surface of the turbine shell 23 at the oblique angle of inclination a relative to the rotation axis X, as best shown in FIGS. 3, 6 and 11. Preferably, the coupling pins 26 have a cylindrical shape (i.e., circular shape in cross-section). Alternatively, the coupling pins 26 may have any other shape in cross-section, like oval, triangular or any other feasible shape.

Further, according to the exemplary embodiment of the present invention as best illustrated in FIG. 6, the first damper retainer 40A is made from steel blank by stamping. The first damper retainer 40A has at least one and preferably four (4) substantially identical bayonet slots 44 extending angularly along a radially outer peripheral edge 47 of the first damper retainer 40A. The number of the bayonet slots 44 corresponds to the number of the coupling pins 26. Each of the bayonet slots 44 is configured to receive one of the coupling pins 26. Thus, number of the bayonet slots 44 corresponds to the number of the coupling pins 26. The bayonet slots 44 are disposed in the radially outer flange 45 of the first damper retainer 40A.

First, the turbine wheel 22 is mounted to the preassembled torsional vibration damper 18 by angularly aligning the coupling pins 26 with the entry ports 44e of the bayonet slots 44 in the first damper retainer 40A, then axially inserting the coupling pins 26 into the entry ports 44e of the bayonet slots 44, as shown in FIGS. 12 and 13. Next, the turbine wheel 22 and the preassembled torsional vibration damper 18 are rotated relative to each other so that the coupling pins 26 are placed angularly in the middle of the bayonet slots 44, as shown in FIG. 14. After that the turbine wheel 22 with the torsional vibration damper 18 are mounted to the turbine hub 28. Then the turbine flange 23f of the turbine wheel 22 and the mounting flange 37 of the driven member 36 of the torsional vibration damper 18 are non-movably (i.e., fixedly) secured to the flange 30 of the turbine hub 28 by the rivets 7 or any other fasteners, as shown in FIGS. 3 and 4B.

Next, the locking piston 32 is slidably mounted to the turbine hub 28, as best shown in FIG. 2, so that the ancillary damper elastic members 54 are held in the interface between the internal tabs of the connecting member 52, the driving tabs 51 of the drive member 50 and the abutment elements 56 of the second damper retainer 40B.

Then, the turbine wheel 20, the impeller wheel 22, and the stator 24 are assembled together so as to form the torque converter 14, as best shown in FIG. 1.

After that, the first casing shell $12_1$ is sealingly fixed to the second casing shell $12_2$ of the casing 12 by the weld $12w$ at their outer peripheries so that the torque converter 14 with the torsional vibration damper 18 and the lock-up clutch 16 is sealed within the casing 12.

Various modifications, changes, and alterations may be practiced with the above-described embodiment.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque-coupling device for coupling together a driving shaft and a driven shaft, the torque-coupling device comprising:
    an impeller wheel coaxial with a rotation axis;
    a turbine wheel coaxial with and drivable by the impeller wheel, the turbine wheel including a turbine shell and at least one coupling pin extending radially outwardly from an outer peripheral surface of the turbine shell;
    a torsional vibration damper; and
    a turbine hub non-rotatably connected to the turbine wheel;
    the torsional vibration damper comprising:
        a first damper retainer rotatable about the rotation axis;
        a driven member rotatable relative to the first damper retainer coaxially with the rotation axis; and
        a plurality of damper elastic members interposed between the first damper retainer and the driven member, the damper elastic members elastically coupling the first damper retainer to the driven member;
    the turbine hub non-rotatably coupled to the driven member of the torsional vibration damper;
    the first damper retainer having at least one bayonet slot configured to receive the at least one coupling pin therein such that the at least one coupling pin is moveable in the at least one bayonet slot relative to the first damper retainer.

2. The hydrokinetic torque-coupling device as defined in claim 1, wherein the turbine wheel is formed from a lightweight material having lower volumetric mass density, lower tensile strength at high operating temperatures and higher coefficient of expansion than steel.

3. The hydrokinetic torque-coupling device as defined in claim 2, wherein the lightweight material one of a polyetheretherketone (PEEK) thermoplastic polymer, phenolic polymer, polyamide-imide polymer, carbon fiber filament (CFF) and magnesium alloy.

4. The hydrokinetic torque-coupling device as defined in claim 1, wherein the at least one coupling pin is disposed in the at least one bayonet slot so as to define gaps between the at least one coupling pin and axially opposite sides of the at least one bayonet slot in the first damper retainer.

5. The hydrokinetic torque-coupling device as defined in claim 1, wherein the at least one coupling pin extends radially outwardly from the outer peripheral surface of the turbine shell at an angle of inclination relative to the rotation axis in the direction toward the first damper retainer.

6. The hydrokinetic torque-coupling device as defined in claim 5, wherein the angle of inclination is in a range from 10° to 90°.

7. The hydrokinetic torque-coupling device as defined in claim 1, wherein the first damper retainer includes a radially oriented first retainer plate and a radially outer flange extending outwardly from the first retainer plate toward the at least one coupling pin at an angle to a central axis of the at least one coupling pin.

8. The hydrokinetic torque-coupling device as defined in claim 7, wherein an angle of inclination of the radially outer flange of the first damper retainer is in a range from 0° to 80°.

9. The hydrokinetic torque-coupling device as defined in claim 7, wherein the at least one bayonet slot is formed in the radially outer flange of the first damper retainer.

10. The hydrokinetic torque-coupling device as defined in claim 1, wherein the at least one bayonet slot extends angularly along a radially outer peripheral edge of the first damper retainer.

11. The hydrokinetic torque-coupling device as defined in claim 1, wherein the torsional vibration damper further comprises a second damper retainer disposed axially opposite the first damper retainer and non-movably secured to the first damper retainer.

12. The hydrokinetic torque-coupling device as defined in claim 11, wherein the damper elastic members are disposed in series relative to each other between the first and second damper retainers.

13. The hydrokinetic torque-coupling device as defined in claim 1, wherein the torsional vibration damper further comprises a substantially annular intermediate member mounted about the driven member and rotatably moveable relative thereto, wherein the first damper retainer is elastically coupled to the intermediate member through the damper elastic members interposed between the first damper retainer and the intermediate member, and wherein the intermediate member is elastically coupled to the driven member through the damper elastic members interposed between the intermediate member and the driven member.

14. The hydrokinetic torque-coupling device as defined in claim 1, wherein the at least one bayonet slot has an entry port formed by an opening in the radially outer peripheral edge of the first damper retainer, and wherein the entry port of the at least one bayonet slot is configured for inserting the at least one coupling pin into the at least one bayonet slot.

15. The hydrokinetic torque-coupling device as defined in claim 1, further comprising an annular locking piston slidably mounted to the turbine hub for axially reciprocating movement thereon.

16. The hydrokinetic torque-coupling device as defined in claim 15, wherein the torsional vibration damper further comprises a second damper retainer disposed axially opposite the first damper retainer and non-movably secured to the first damper retainer.

17. The hydrokinetic torque-coupling device as defined in claim 16, wherein the torsional vibration damper further comprises a drive member non-movably secured to the locking piston.

18. The hydrokinetic torque-coupling device as defined in claim 17, wherein the second damper retainer further includes at least one abutment element extending outwardly from the second retainer plate toward the drive member and the locking piston.

19. The hydrokinetic torque-coupling device as defined in claim 18, wherein the torsional vibration damper further comprises a plurality of ancillary damper elastic members disposed between the drive member and the at least one abutment element so as to elastically couple the second damper retainer to the drive member.

20. A method for assembling a hydrokinetic torque-coupling device for coupling together a driving shaft and a driven shaft, the method comprising the steps of:
providing a turbine hub;
providing a preassembled turbine wheel, the turbine wheel including a turbine shell and formed with at least one coupling pin formed integrally with the turbine shell and extending radially outwardly from an outer peripheral surface of the turbine shell;
providing at least partially preassembled torsional vibration damper including a first damper retainer formed with at least one angularly extending bayonet slot configured to receive the at least one coupling pin therein, a driven member rotatable relative to the first damper retainer coaxially therewith, and a plurality of damper elastic members interposed between the first damper retainer and the driven member for elastically coupling the first damper retainer to the driven member;
mounting the turbine wheel to the at least partially preassembled torsional vibration damper so that the at least one coupling pin is placed angularly in the middle of the at least one bayonet slot; and
non-rotatably securing the turbine wheel and the at least partially preassembled torsional vibration damper to the turbine hub.

21. The method as defined in claim 20, wherein the at least one bayonet slot has an entry port formed by an opening in a radially outer peripheral edge of the first damper retainer, and wherein the entry port of the at least one bayonet slot is configured for inserting the at least one coupling pin into the at least one bayonet slot, and wherein the step of mounting the turbine wheel to the at least partially preassembled torsional vibration damper includes the steps of:
angularly aligning the at least one bayonet slot with the entry ports of the at least one bayonet slot in the first damper retainer;
axially inserting the at least one coupling pin into the at least one bayonet slot;
rotating the turbine wheel or the preassembled torsional vibration damper relative to each other so that the at least one coupling pin is placed angularly in the middle of the at least one bayonet slot.

* * * * *